United States Patent [19]

Wlodkowski

[11] Patent Number: 4,597,679
[45] Date of Patent: Jul. 1, 1986

[54] APPARATUS FOR LUBRICATING A BEARING ASSEMBLY

[75] Inventor: Henry W. Wlodkowski, Holden, Mass.

[73] Assignee: Coppus Engineering Corporation, Worcester, Mass.

[21] Appl. No.: 783,423

[22] Filed: Oct. 3, 1985

[51] Int. Cl.[4] ............ F16C 33/66; F16C 33/10; F01M 9/06
[52] U.S. Cl. .................. 384/462; 184/11.5; 384/406
[58] Field of Search ............... 384/403–406, 384/462, 465; 308/85 A, 85 B; 184/11.5

[56] References Cited

U.S. PATENT DOCUMENTS

| 1,313,736 | 8/1919 | Rice | 384/406 |
| 1,808,792 | 6/1931 | Schellens | 384/406 |
| 2,255,662 | 9/1941 | Gulow | 384/405 X |
| 2,335,557 | 11/1943 | Winther | 384/406 |
| 2,445,432 | 7/1948 | Hodell | 384/406 |
| 3,826,338 | 7/1974 | Mair | 184/11.5 X |

Primary Examiner—Stuart S. Levy
Assistant Examiner—Thomas R. Hannon
Attorney, Agent, or Firm—Thompson, Birch

[57] ABSTRACT

A shaft is rotatably journalled in a bearing assembly. The shaft has a sleeve fixed thereon at a location axially adjacent to the bearing assembly, and a ring depends from the sleeve into a supply of liquid lubricant contained in an underlying sump. Rotation of the shaft and sleeve causes the ring to rotate about its own axis, and the rotating ring carries lubricant upwardly from the sump, with the thus carried liquid ultimately being returned to the sump by a combination of centrifugal and gravitational forces. A dam is interposed between the underside of the sleeve and the ring depending therefrom to direct a substantial and continuous flow of the returning lubricant to the bearing assembly.

4 Claims, 3 Drawing Figures

APPARATUS FOR LUBRICATING A BEARING ASSEMBLY

BACKGROUND OF THE INVENTION

1. Field of the Invention

This invention relates generally to turbines and the like having shafts journalled for high speed rotation in bearings, and is concerned in particular with an improvement in the lubrication of such bearings.

2. Description of the Prior Art

In a conventional system for lubricating ball bearings, the lower portion of the bearing assembly is submerged in an underlying bath of liquid lubricant, e.g., oil. This produces satisfactory results at relatively low operating speeds. However, at higher operating speeds on the order of those encountered in turbine applications, severe problems are encountered. For example, the submerged bearing components churn and impart turbulence to the oil bath, and an increase in fluid friction within the bearing is experienced. This in turn results in excessive operating temperatures. Moreover, the turbulence in the oil bath causes oil to be thrown out through the seals, making it difficult to maintain the oil at an optimum level for efficient lubrication.

In an attempt at avoiding these problems, the system shown in FIG. 1 has been developed for certain high speed turbine applications. Here the turbine shaft 10 is rotatably journalled in a ball bearing assembly 12 enclosed in a housing 14. The housing has a base portion 16 which defines a sump 18 underlying the shaft, and a cap 20 which cooperates with a retainer portion 22 of the housing to hold the bearing assembly in place. The sump 16 is adapted to contain a supply 24 of liquid lubricant. In order to avoid excessive churning and frothing of the lubricant, the lubricant surface is maintained at a level beneath that of the rotating shaft and the rotatable bearing components. A sleeve 26 is fixed to the shaft at a location directly adjacent to the bearing, and a ring 28 is suspended from the sleeve. The ring 28 has a diameter considerably greater than that of the sleeve 26, and the lower ring portion dips downwardly into the liquid lubricant 24 in the sump.

As the shaft 10 and sleeve 26 rotate, the frictional contact between the sleeve and the ring 28 causes the latter to rotate about its axis. Lubricant is carried upwardly from the sump by the rotating sleeve, and some of the thus carried lubricant ultimately finds its way to the bearing before being returned to the sump by centrifugal and/or gravitational forces.

The difficulty with this arrangement is that the application of lubricant to the bearing is at best intermittent, somewhat haphazard, and thus relatively inefficient. Under high speed operating conditions such as those encountered in turbines and the like, reliability can be seriously compromised by the shortened bearing life resulting not only from inefficient lubrication, but more importantly from the insufficient dissipation of heat from the bearing assembly.

The objective of the present invention is to overcome the above described problems by providing a more reliable and efficient means of continuously supplying lubricant to the bearing.

SUMMARY OF THE PRESENT INVENTION

The present invention provides a dam extending from the bearing into the space between the underside of the shaft mounted sleeve and that portion of the ring depending therefrom. The dam is appropriately configured and dimensioned to reliably direct a substantial and continuous flow of the returning lubricant to the bearing.

Preferably, the dam constitutes an integral part of the bearing retainer, and includes a conical surface cooperating in radially spaced relationship with a conical surface on the sleeve to define an inlet passageway leading to the bearing.

Advantageously, the inlet passageway is arranged to admit lubricant into the retainer on one side of the bearing, and the retainer is provided with an outlet opening on the opposite side of the bearing through which lubricant can exit from the retainer for return to the sump after having passed through the bearing.

DETAILED DESCRIPTION OF ILLUSTRATED EMBODIMENT

Figure 1:
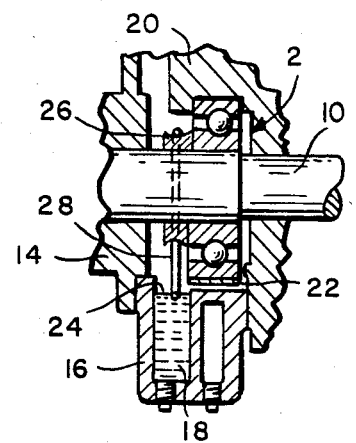
FIG. 1 is a diagrammatic illustration of the prior art arrangement for lubricating a horizontal shaft bearing in a high speed turbine.
Figure 2:
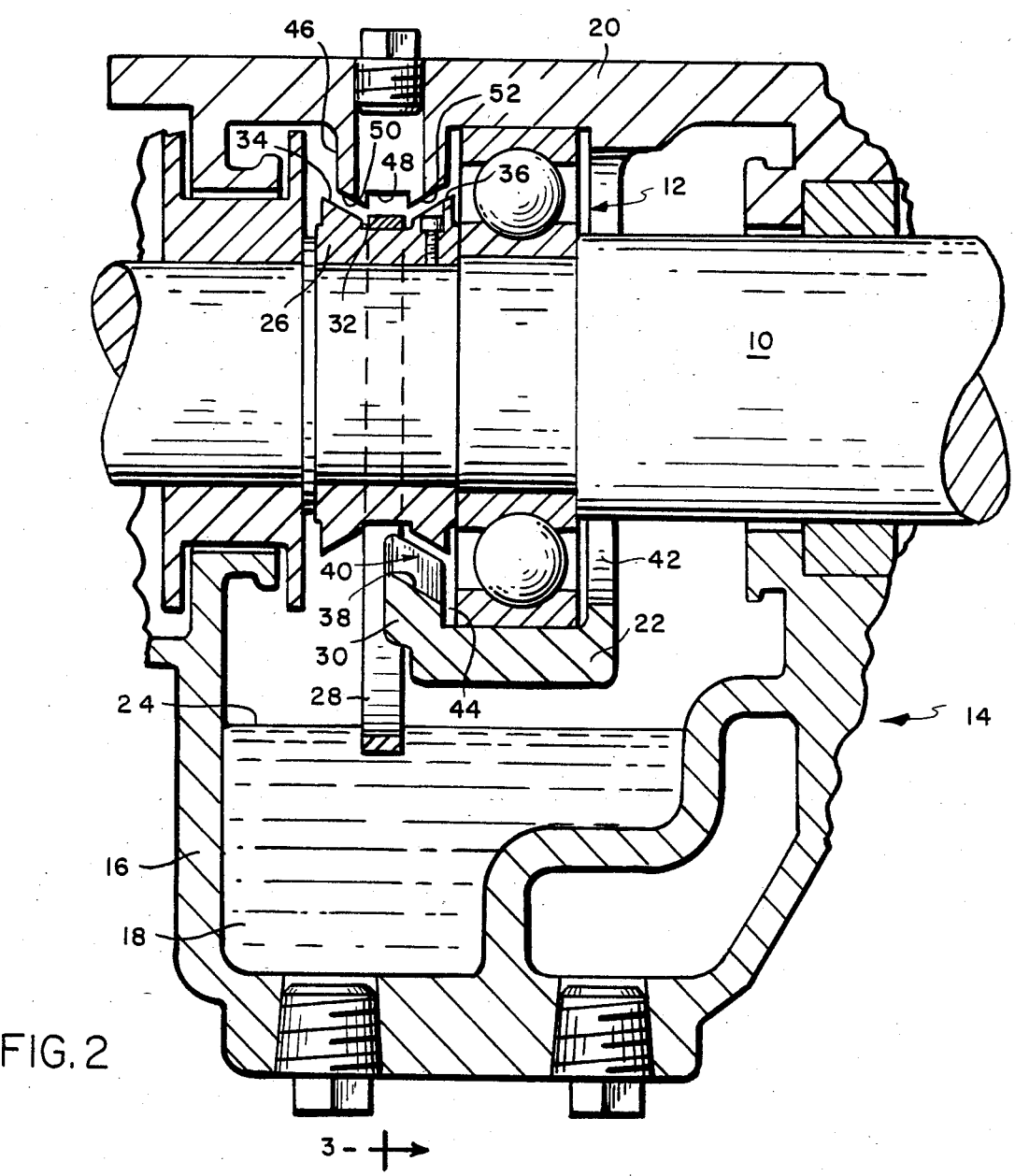
FIG. 2 is a longitudinal sectional view through a portion of a turbine in accordance with the present invention.
Figure 3:
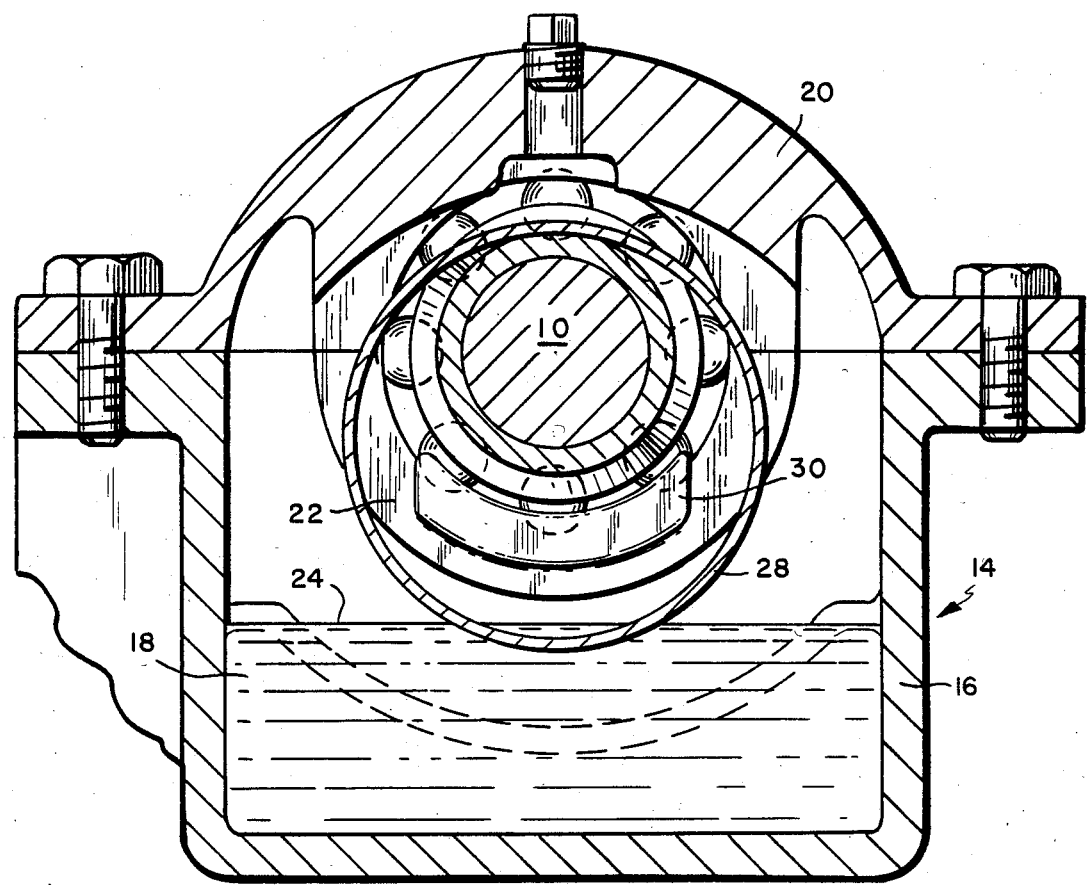
FIG. 3 is a sectional view taken along line 3—3 of FIG. 2.

A preferred embodiment of an arrangement in accordance with the present invention is depicted in FIGS. 2 and 3, where elements which are common to those of the prior art arrangement of FIG. 1 have been identified by the same reference numerals.

According to the present invention, an arcuate dam 30 is interposed between the underside of the sleeve 26 and that portion of the ring 28 depending therefrom. The dam preferably comprises an integral part of the bearing retainer 22.

The sleeve 26 has a centrally located cylindrical land 32 supporting the ring 28, with oppositely inclined surfaces 34, 36 extending axially and radially outwardly therefrom. The surface 36 cooperates in radially spaced relationship with an inclined surface 38 on the dam 30 to define an inlet passageway 40 for admitting lubricant into the retainer 22 on one side of the bearing assembly 12. The retainer has an outlet opening 42 on the opposite side of the bearing assembly 12.

As the shaft 10 and sleeve 26 rotate, frictional contact between the sleeve and ring 28 causes the latter to rotate about its own axis. The rotating ring carries lubricant upwardly from the sump 18, and centrifugal and gravitational forces ultimately return the thus carried lubricant downwardly towards the sump. The dam 30 intercepts and diverts a substantial and continuous flow of the returning lubricant through inlet passageway 40 to the bearing assembly 12. The flow of lubricant into and through the passageway 40 to the bearing assembly causes a slight build up of lubricant on one side of the bearing assembly as at 44. From here, the lubricant continues flowing axially through the bearing assembly and then exits from the bearing retainer via outlet opening 42 for ultimate return to the sump 18.

This continuous supply of lubricant to the bearing assembly is extremely advantageous, not only because it provides improved lubrication of the rotating bearing components, but also because it removes more heat from the bearing assembly and thus significantly lowers operating temperatures. The net result is a significant increase in bearing life, which is achieved without unduly complicating the lubrication system.

Preferably, the housing cap 20 includes a radially inwardly protruding portion 46 having a partly cylindrical land 48 and oppositely inclined conical surfaces 50, 52 which cooperate in closely spaced relationship with the conical surfaces 34, 36 on the sleeve 26 to maintain the ring 28 seated on the cylindrical sleeve land 32.

I claim:

1. For use in combination with a horizontal shaft journaled for rotation in a bearing, apparatus for lubricating said bearing, said apparatus comprising:
   housing means forming a sump underlying said shaft, said sump being adapted to contain a supply of liquid lubricant;
   a sleeve mounted on said shaft for rotation therewith at a location axially adjacent to said bearing, said sleeve having a cylindrical surface and an inclined surface extending axially and radially outwardly from said cylindrical surface towards said bearing;
   a ring suspended from said sleeve, said ring having an inner diameter which is larger than the outer diameter of said sleeve, with the lowermost portion of said ring being spaced vertically beneath the underside of said sleeve and being arranged to depend downwardly into the lubricant in said sump, said ring being rotatable in response to rotation of said shaft and sleeve to thereby carry lubricant on the surface thereof upwardly from said sump, with the thus carried lubricant ultimately being returned to said sump by a combination of cetrifugal and gravitational forces; and
   dam means extending from said bearing into the space between the lowermost portion of said ring and the underside of said sleeve, said dam means including a second inclined surface cooperating in radially spaced relationship with the inclined surface on said sleeve to define a passageway leading towards said bearing, said dam means being configured and dimensioned to divert a significant portion of the returning lubricant through said passageway to said bearing.

2. The apparatus of claim 1 wherein said housing means further comprises a retainer for said bearing, and wherein said dam means comprises an integral part of said retainer.

3. The apparatus of claim 1 wherein said dam means is formed as an integral part of a retainer at least partially encircling said bearing, with said passageway being arranged to admit lubricant into said retainer on one side of said bearing, and with an opening in said retainer on the opposite side of said bearing arranged to allow the thus admitted lubricant to exit from said retainer after having first passed through said bearing.

4. The apparatus of claim 1 further comprising additional cylindrical and inclined surfaces on said housing means cooperating in radially spaced relationship with the cylindrical surface and first and second inclined surfaces on said sleeve to confine said ring in its seated position on said sleeve.

* * * * *